US006342826B1

(12) United States Patent
Quinn et al.

(10) Patent No.: US 6,342,826 B1
(45) Date of Patent: Jan. 29, 2002

(54) PRESSURE AND TEMPERATURE RESPONSIVE SWITCH ASSEMBLY

(75) Inventors: William F. Quinn, Greenwich, OH (US); James B. Kalapodis, Fayetteville, NC (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 0 days.

(21) Appl. No.: 09/372,739

(22) Filed: Aug. 11, 1999

(51) Int. Cl.[7] ........................ H01H 37/52; H01H 37/02; H01M 2/34; H01M 2/00
(52) U.S. Cl. ..................... 337/300; 337/299; 337/3; 337/13; 429/62; 429/7
(58) Field of Search ............................ 337/3, 13, 139, 337/140, 141, 382, 393, 395, 380, 112, 298–372, 765; 429/7, 61, 62, 57, 66, 58, 71, 122, 174, 541

(56) References Cited

U.S. PATENT DOCUMENTS

| | | |
|---|---|---|
| 2,497,397 A | 2/1950 | Dales |
| 2,743,335 A | 4/1956 | Moyer |
| 3,213,250 A | 10/1965 | Marcoux |
| 3,474,372 A | 10/1969 | Davenport et al. |
| 3,707,694 A | 12/1972 | DuRocher |
| 3,801,944 A | 4/1974 | Brown |
| 4,035,552 A | 7/1977 | Epstein |
| 4,188,460 A | 2/1980 | Kang et al. |
| 4,328,406 A * | 5/1982 | Evans et al. ............... 200/293 |
| 4,356,478 A | 10/1982 | Muggli et al. |
| 4,374,311 A | 2/1983 | Okahashi et al. |
| 4,395,694 A | 7/1983 | Wehl |
| 4,503,131 A | 3/1985 | Baudrand |
| 4,774,151 A | 9/1988 | Cuomo et al. |
| 4,782,318 A | 11/1988 | Boulanger |
| 4,818,641 A | 4/1989 | Ledenican |
| 4,821,010 A | 4/1989 | Plasko |
| 4,855,195 A | 8/1989 | Georgopoulos et al. |
| 4,973,936 A | 11/1990 | Dimpault-Darcy et al. |
| 4,975,341 A | 12/1990 | Tucholski et al. |
| 4,992,339 A | 2/1991 | Georgopoulos |
| 5,026,615 A | 6/1991 | Tucholski |
| 5,061,914 A | 10/1991 | Busch et al. |
| 5,188,909 A | 2/1993 | Pedicini |
| 5,206,622 A | 4/1993 | Lattari |
| 5,268,664 A | 12/1993 | Givler |
| 5,337,036 A | 8/1994 | Kuczynski |

(List continued on next page.)

FOREIGN PATENT DOCUMENTS

| | | | |
|---|---|---|---|
| EP | 0 689 255 A3 | 3/1996 | |
| EP | 0 700 109 A1 | 3/1996 | |
| EP | 0 757 394 A1 | 2/1997 | |
| EP | 0 773 595 A1 | 5/1997 | |
| JP | 63 175 345 | 7/1984 | |
| JP | 59 191 273 | 10/1984 | |
| JP | 59 203 376 | 11/1984 | |
| JP | 4-292868 * | 10/1992 | .......... H01M/10/39 |
| JP | 04 345 724 | 12/1992 | |
| JP | 0 689 255 A2 | 5/1995 | |
| JP | 08 185 849 | 7/1996 | |
| JP | 08 236 102 | 9/1996 | |
| JP | 10-154530 * | 6/1998 | .......... H01M/10/40 |

Primary Examiner—Leo P. Picard
Assistant Examiner—Anatoly Vortman
(74) Attorney, Agent, or Firm—Harness, Dickey & Pierce, P.L.C.

(57) ABSTRACT

A switch having closed and open positions moves from one position to the other in response to either an elevated temperature or an excessive pressure. A switch member of bimetal material or shape memory alloy operates in response to an elevated temperature, and a foil diaphragm that cooperates with a bumper operates the switch member in response to elevated pressure. The diaphragm may rupture to vent excessive pressure in the event pressure continues to rise despite operation of the switch member or due to failure of the switch member to operate.

40 Claims, 16 Drawing Sheets

U.S. PATENT DOCUMENTS

| | | |
|---|---|---|
| 5,376,467 A | 12/1994 | Abe et al. |
| 5,567,539 A | 10/1996 | Takahashi et al. |
| 5,619,177 A | 4/1997 | Johnson et al. |
| 5,691,073 A | 11/1997 | Vu et al. |
| 5,747,187 A | 5/1998 | Byon |
| 5,750,277 A | 5/1998 | Vu et al. |
| 5,766,790 A | 6/1998 | Kameishi et al. |
| 5,766,793 A | 6/1998 | Kameishi et al. |
| 5,825,275 A | 10/1998 | Wuttig et al. |
| 5,844,464 A | 12/1998 | Kalapodis et al. |
| 5,879,832 A | 3/1999 | Vu et al. |
| 5,998,051 A * | 12/1999 | Poirier et al. .................. 429/7 |

* cited by examiner

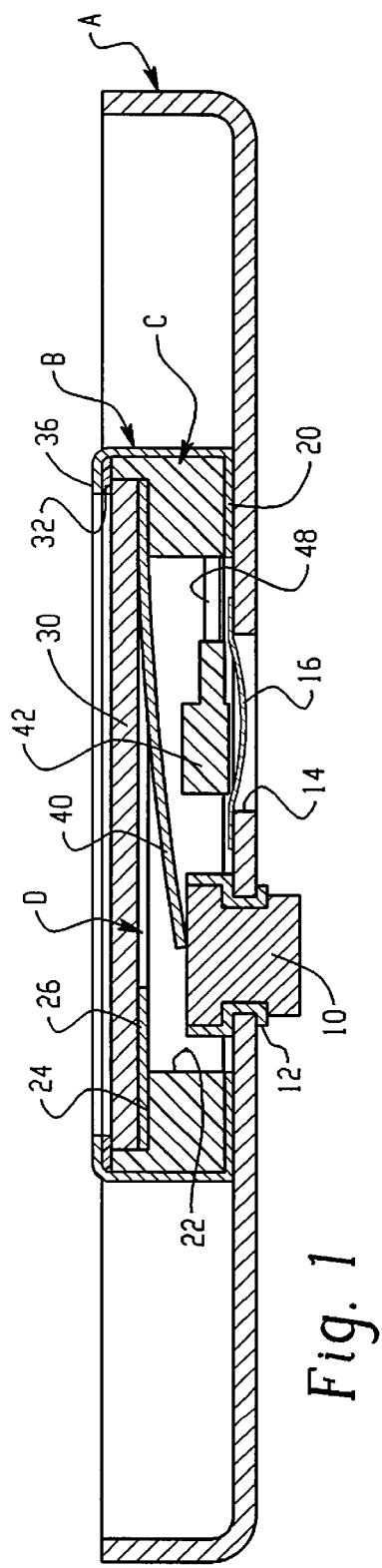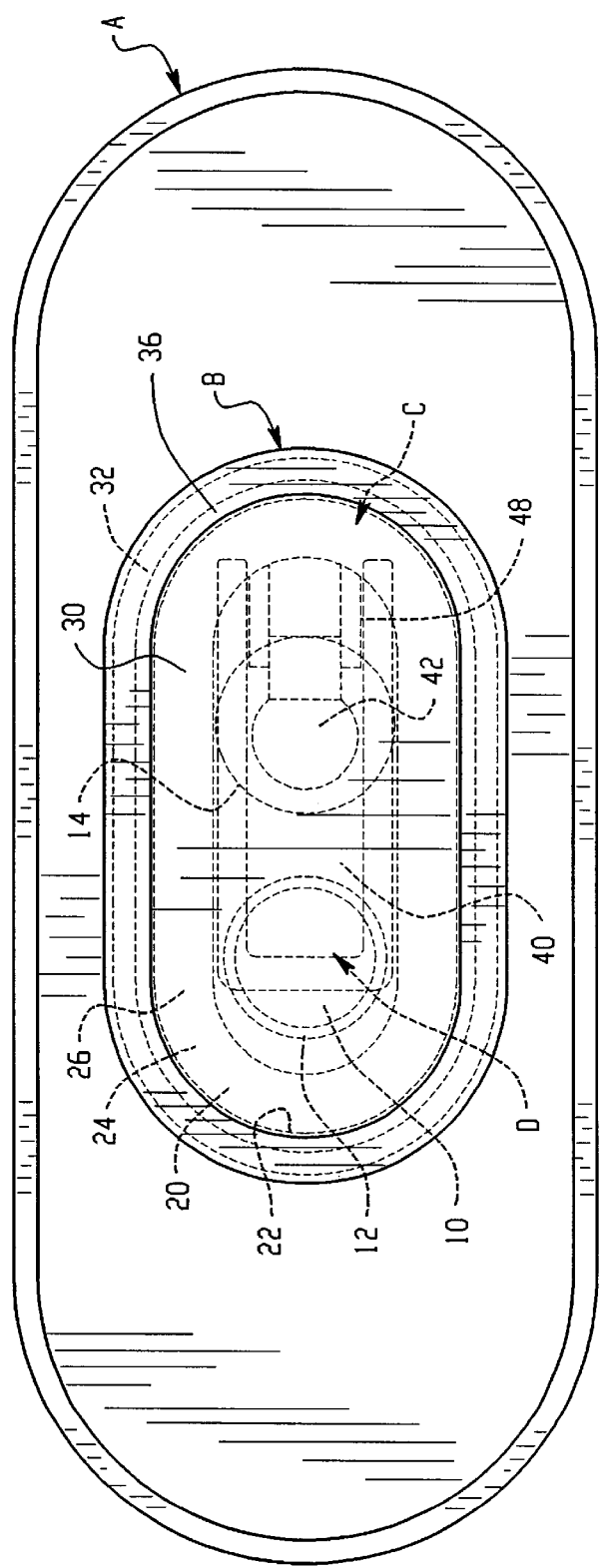
Fig. 1
Fig. 2

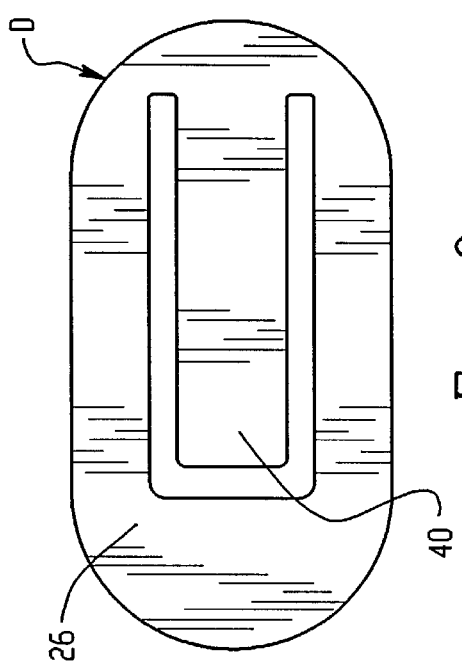
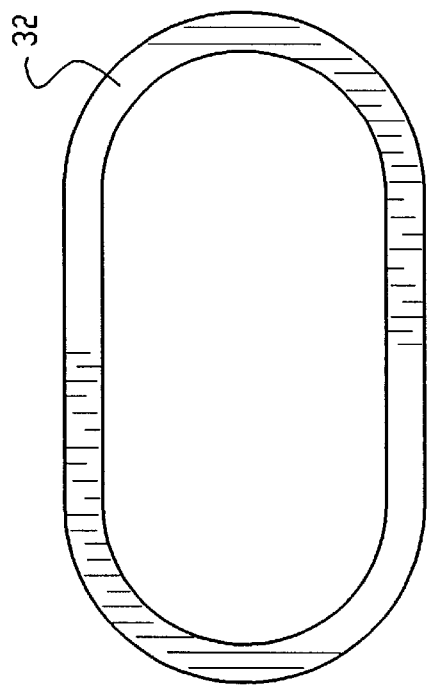
Fig. 9
Fig. 10
Fig. 7
Fig. 8

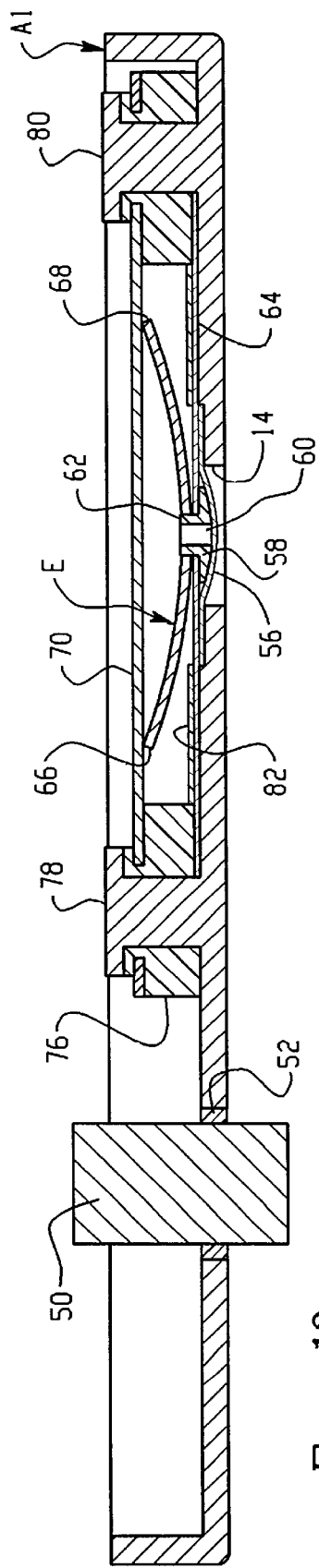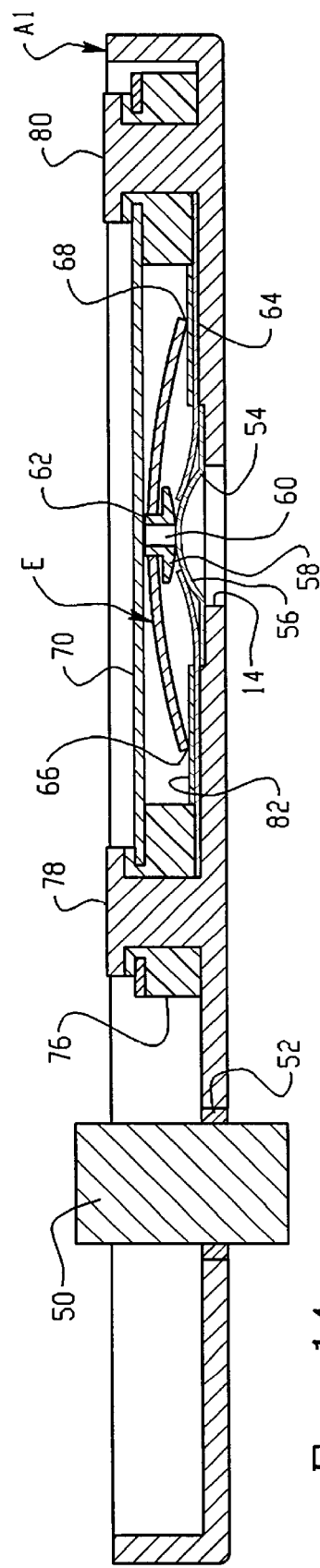

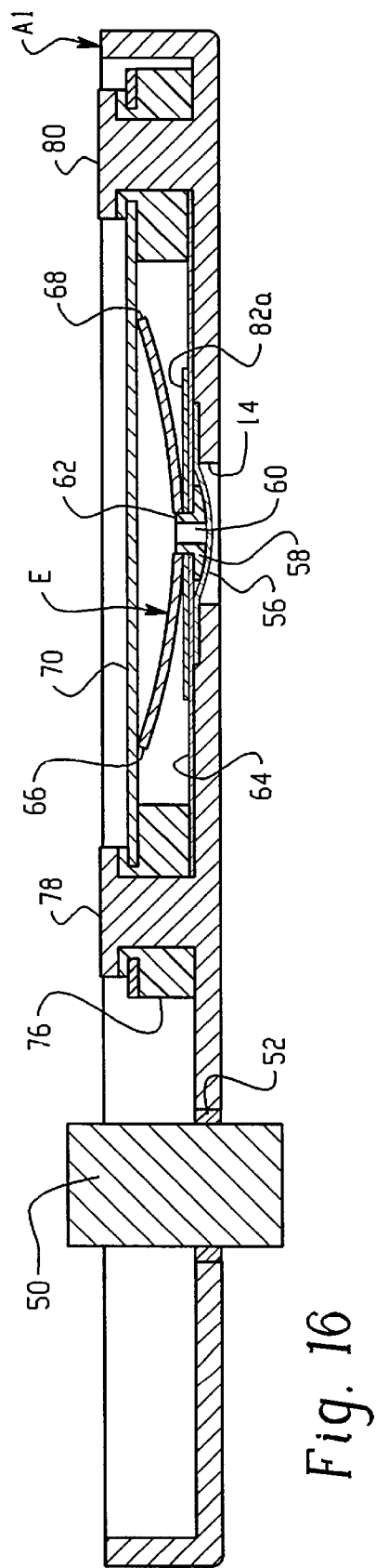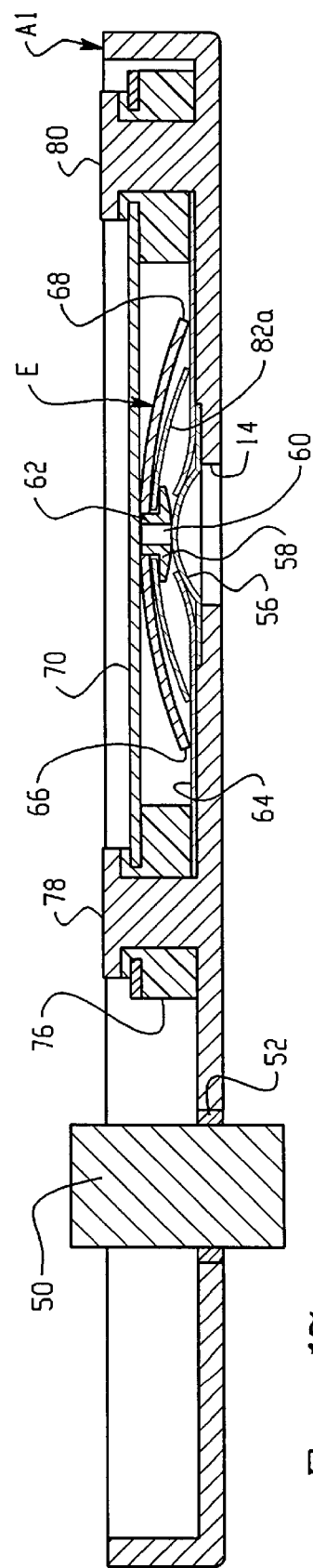
Fig. 16
Fig. 17

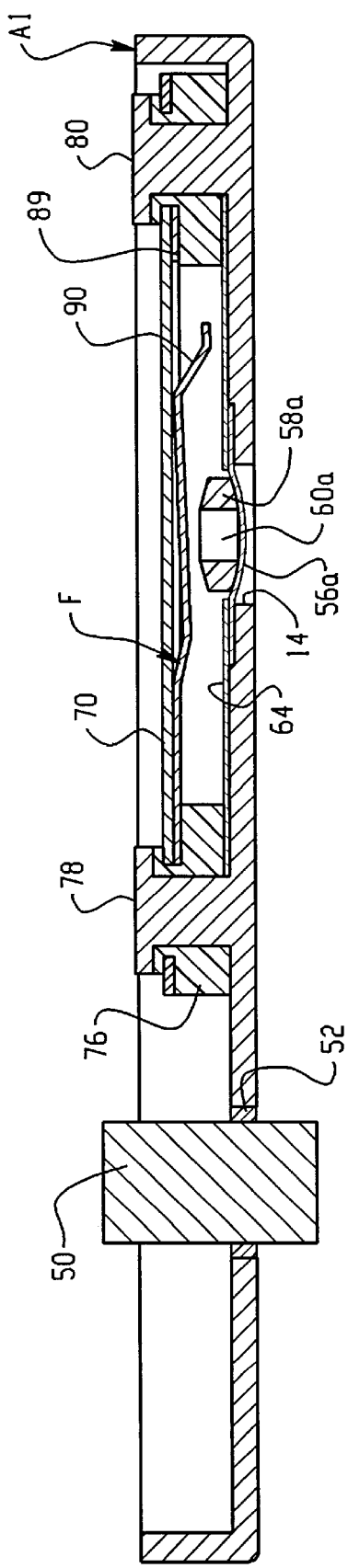
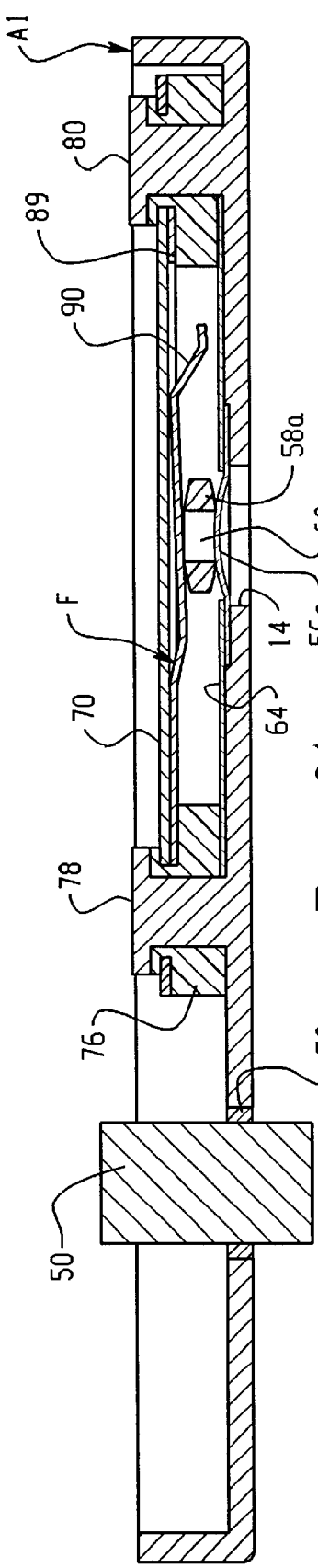

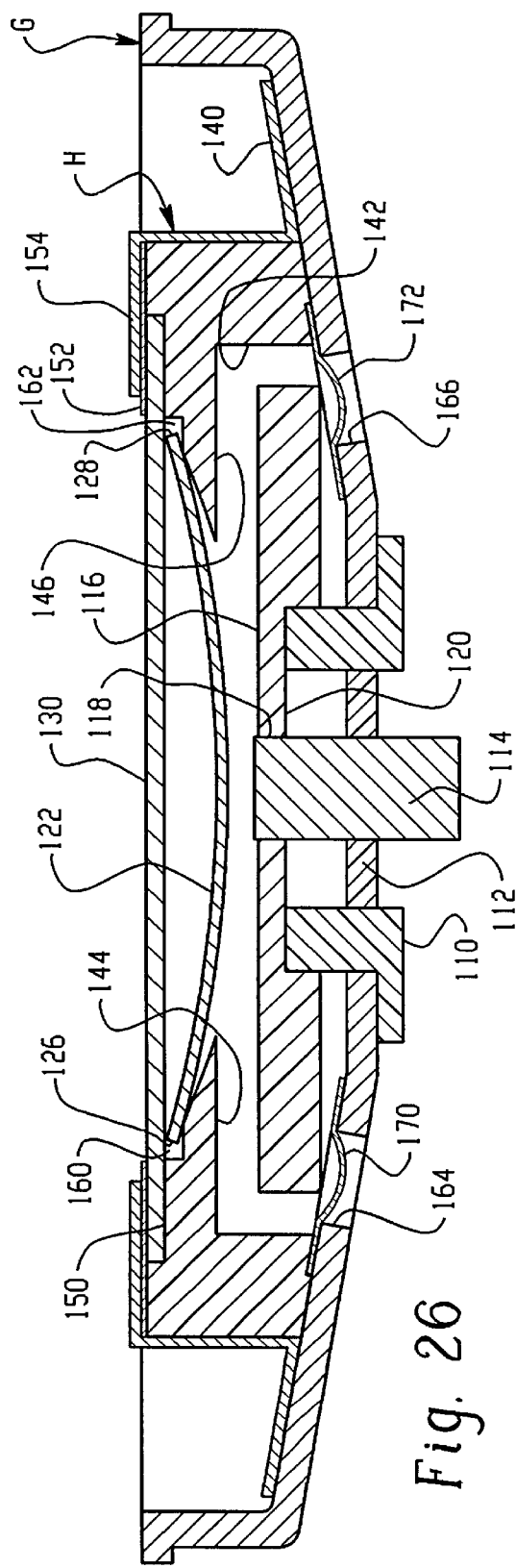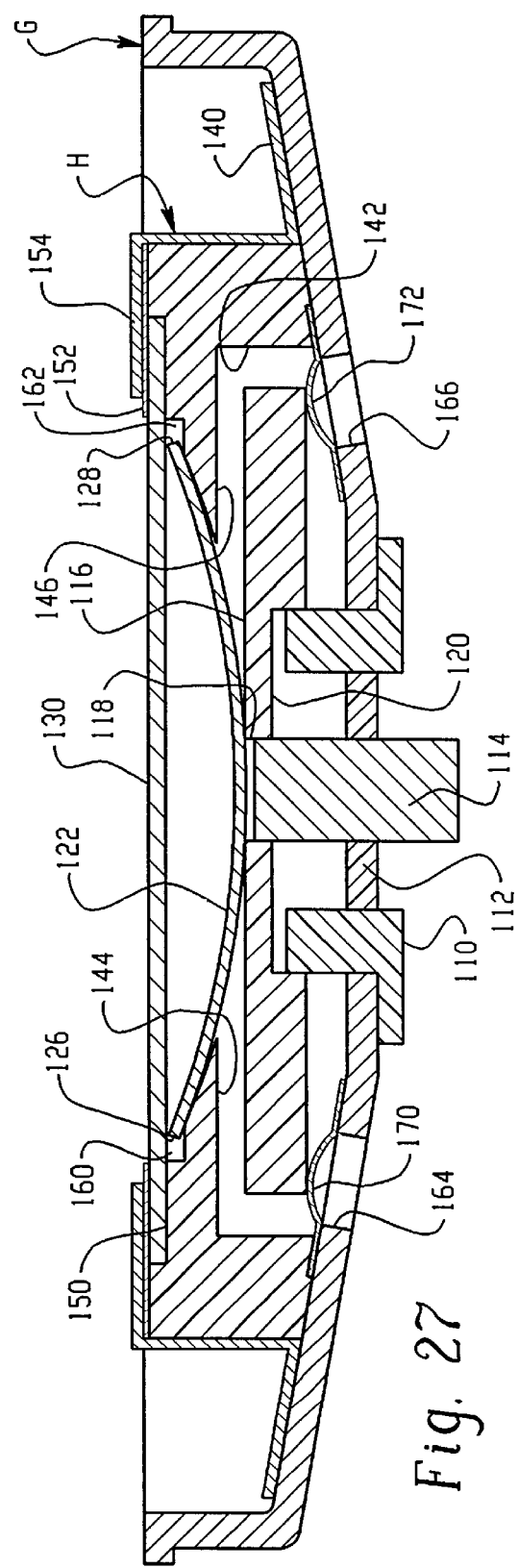

PRESSURE AND TEMPERATURE RESPONSIVE SWITCH ASSEMBLY

BACKGROUND OF THE INVENTION

This application relates to the art of switches and, more particularly, to switches that automatically move from either a normally open or a normally closed position to the opposite position in response to a change in pressure or temperature. The invention is particularly applicable for use with rechargeable batteries and will be described with specific reference thereto. However, it will be appreciated that the invention has broader aspects and can be used with other devices where it is desired to open or close a circuit in response to an elevated pressure or temperature. The invention also will be described with reference to a switch assembly that responds to either pressure or temperature. However, it will be appreciated that the pressure and temperature responsive features do not necessarily have to be used together and that each feature is capable of independent use.

Circuit devices that respond to temperature and/or pressure are used with batteries to interrupt charging or discharging of the battery in the event of thermal runaway that may raise the battery internal pressure and/or temperature to undesirable levels. The circuit devices are intended to interrupt battery charging or discharging before undesirable temperature and/or pressure levels are reached. Arrangements also are used for venting the battery case responsive to an excessive internal pressure. Existing arrangements of this type are relatively complicated and/or have a relatively high resistance that reduces the efficiency of battery discharge and recharge.

SUMMARY OF THE INVENTION

A pressure and temperature responsive switch assembly includes a movable switch member that is in either a normally open or a normally closed position under normal temperature and/or pressure conditions. The switch member is of a bimetal material or of a shape memory alloy that responds to an elevated temperature by moving from the one normal position to the opposite position. A force transfer member such as a bumper is positioned between the switch member and a snap-acting foil diaphragm that responds to a predetermined pressure for moving the switch member from one position to the other in response to an elevated pressure acting on the opposite side of the diaphragm from the bumper. The foil diaphragm itself may rupture in response to excessive pressure for relieving same in the event increasing pressure is not interrupted by operation of the switch.

In a preferred arrangement, the temperature responsive switch member is of shape memory alloy that has a deformed shape at normal temperatures and a recovered shape at an elevated temperature. The switch member of shape memory alloy may have either a normally open or a normally closed position when it is in its deformed shape at normal temperatures, and automatically moves to the opposite position at an elevated temperature by changing to its recovered shape.

In other arrangements, the temperature responsive switch member is a bimetal that may have either a normally open or a normally closed position at normal temperatures, and automatically moves to the opposite position at an elevated temperature.

In one arrangement, a movable bumper integral with an insulator that supports a base portion of the switch member cooperates with a pressure responsive snap-acting foil diaphragm to impart movement to the movable switch member. An attachment ring secured to a housing member holds the support insulator in position.

A switch assembly that uses the bimetal or shape memory switch member may be attached to a housing member such as the lid of a battery case or a battery case itself, or to a housing for another device that may produce an excessive temperature and/or internal pressure. A switch assembly in accordance with the present application responds to an elevated pressure or temperature by interrupting the charging or discharging state of the battery before the pressure or temperature become excessive.

In one arrangement, a housing member has a fixed contact attached thereto and a snap-acting foil diaphragm normally closes a pressure port in the housing member adjacent the fixed contact. In its deformed shape at normal temperatures, a switch blade of shape memory metal has an end portion engaging the fixed contact and moves to an open position out of engagement with the fixed contact in response to an elevated temperature by assuming its recovered shape.

A movable dielectric force transfer member such as a bumper is located between the pressure responsive snap-acting foil diaphragm and the switch blade, and the blade is movable with the diaphragm and bumper in response to an elevated pressure for placing the switch blade in an open position. In one arrangement, the switch blade is on a switch blade member that has a base portion supported by an annular support insulator attached to the housing member by an attachment ring. A metal terminal plate is held to the support insulator against the base portion of the switch blade member, and an electrical lead is attachable to the terminal plate.

In one arrangement, the fixed contact may be a conductive foil located on the housing member outwardly of the pressure port that normally is closed by the snap-acting foil diaphragm.

In another arrangement for a normally closed switch, the switch member may be a bimetal that is a bowed strip or a disc having a central portion cooperable with a movable force transfer member such as a bumper. The peripheral edge of the disc or the end edges of the strip switch member engage a metal terminal plate, and a conductive foil attached to the housing member provides a fixed contact that is positioned in engagement with the central portion of the switch member between the switch member and the bumper. The switch member may be a curved bimetal strip or a dished disc that opens a circuit by snapping to a reversed curvature in response to an elevated temperature so that the central portion of the bimetal engages the metal plate and its peripheral edge or end edges engage an electrical insulator positioned on the conductive foil fixed contact and the housing member. Movement of the snap-acting foil diaphragm and bumper responsive to an elevated pressure also causes the normally closed switch member to move to a reversed position for opening a circuit.

In a modified arrangement for a normally open switch, an insulator may be positioned between the disc or bowed strip bimetal switch member and the bumper to provide a normally open circuit. Upon reverse bowing of the switch member, its central portion opposite from the bumper engages a metal terminal plate and its peripheral edge or end edges engage a conductive foil fixed contact located outwardly from the insulator and the bumper to provide a closed circuit position at an elevated temperature or pressure.

In still another arrangement, a disc or bowed strip temperature responsive switch member that may be of shape memory metal or a bimetal has its peripheral edge or end edges engaging a metal plate and a central portion engaging a fixed contact to complete a circuit. The switch member automatically changes shape to move out of engagement with the fixed contact in response to an elevated temperature. Pressure responsive snap-acting foil diaphragms cooperate with a movable force transfer member surrounding the fixed contact to separate the switch member from the fixed contact in response to an elevated pressure.

The improved sensing switch of the present application for sensing elevated temperature and/or temperature conditions may be used in a multi-cell package for such applications as electric vehicles. A sensing switch is associated with each individual cell and disables an individual cell that may experience an elevated pressure or temperature while leaving the remaining cells in operation.

In all of the arrangements, the snap-acting foil diaphragm may be rupturable in response to excessive pressure for relieving same. Thus, even if the switch does not operate responsive to an elevated pressure or temperature, or if the pressure continues to build despite operation of the switch, rupturing of the diaphragm would vent the excessive pressure.

Although the switch may be designed to revert to its original position upon dissipation of an elevated temperature or pressure, it preferably is designed as a one-shot fuse and remains in the position to which it is moved by an elevated temperature or pressure following dissipation of the elevated temperature or pressure.

BRIEF DESCRIPTION OF THE DRAWING

FIG. 1 is a cross-sectional side elevational view of a switch assembly constructed in accordance with the present application;

FIG. 2 is a top plan view thereof;

FIG. 7 is a cross-sectional side elevational view of an insulating washer used in the switch assembly of FIG. 1 and 2;

FIG. 8 is a top plan view thereof;

FIG. 9 is a top plan view of a switch blade member used in the switch assembly of FIGS. 1 and 2;

FIG. 10 is a side elevational view thereof;

FIG. 13 is a cross-sectional elevational view of another embodiment;

FIG. 14 is a view similar to FIG. 13 and showing the switch member in an open position responsive to an elevated pressure;

FIG. 16 is a cross-sectional elevational view similar to FIG. 13 but showing a switch arrangement having a normally open configuration;

FIG. 17 is a view similar to FIG. 16 and showing the switch member in a closed position responsive to an elevated pressure;

FIG. 20 is a view similar to FIG. 19 and showing the switch blade in an open position as a result of an elevated temperature;

FIG. 21 is a cross-sectional elevational view similar to FIG. 19 and showing the switch blade in an open position as a result of an elevated temperature;

FIG. 26 is a cross-sectional side elevational view similar to FIG. 25 and showing a switch member in an open position as a result of an elevated temperature;

FIG. 27 is a cross-sectional side elevational view similar to FIG. 25 and showing the switch blade member in an open position as a result of an elevated pressure;

DESCRIPTION OF PREFERRED EMBODIMENTS

Figure 3:
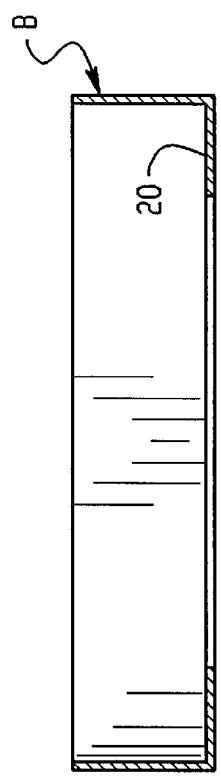
FIG. 3 is a cross-sectional elevational view of an attachment ring used in the switch assembly of FIGS. 1 and 2.
Figure 4:
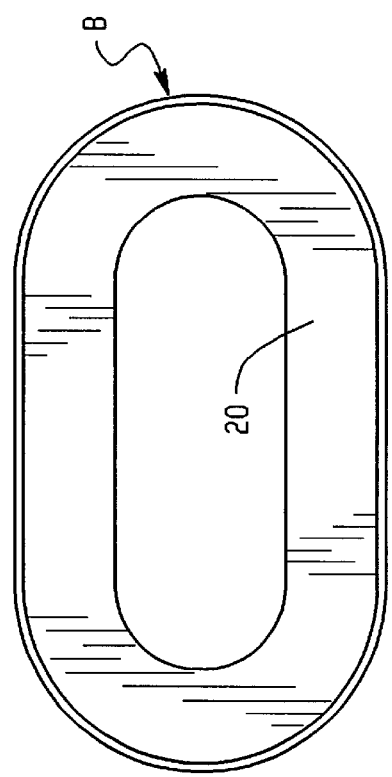
FIG. 4 is a top plan view thereof.

Referring now to the drawing, wherein the showings are for purposes of illustrating certain preferred embodiments of the invention only and not for purposes of limiting same, FIGS. 1 and 2 show a metal housing member A in the form of an end cap, lid or cover for a battery case. It will be recognized that the switch assemblies of the present application can be used with batteries by attaching the switch assembly thereto in ways other than by attachment to the battery case or end cap. It also will be recognized that the switch assembly may be attached to a housing member other than a battery cover or case where protection is desired against excessive temperature or pressure conditions internally of the housing.

A suitable hole is provided in housing member A for receiving a metal rivet 10 that is then deformed for attaching same to housing member A. Metal rivet A defines a fixed electrical contact, and electrical insulation 12 is interposed between the periphery of fixed contact 10 and housing A.

A circular pressure port defined by hole 14 in housing member A is normally closed by a snap-acting flexible metal foil diaphragm 16. The peripheral undersurface of diaphragm 16 is welded or otherwise sealingly attached to the surface of housing member A surrounding hole 14. The central portion of diaphragm 16 is formed to the shape of a smoothly curved dome, dimple or bubble that is shown in a concave configuration extending downwardly into hole 14 in FIG. 1, and that snaps to an opposite upwardly domed convex configuration above hole 14 in response to a predetermined elevated pressure acting thereon. Under normal conditions, the curved bubble is convex in a direction toward the source of possible elevated pressure, and snaps to a reverse curvature in which it is convex in a direction away from the source of elevated pressure.

An insulator attachment ring B has an inwardly extending bottom flange 20 welded or otherwise secured to housing member A in outwardly-spaced surrounding relationship to fixed contact 10 and pressure port 14. A support ring C of electrical insulating material is received in attachment ring B and has a central opening 22 therethrough with an opening periphery located in outwardly-spaced surrounding relationship to fixed contact 10 and hole 14.

An upper peripheral notch or recess 24 in support ring C is stepped outwardly from opening 22 for supporting an annular base portion 26 of a switch blade member D. A metal terminal plate 30 is positioned on base portion 26 of switch blade member D within recess 24. An electrical insulating washer 32 is positioned against the outer peripheral portion of metal plate 30 and the top surface of insulator C, and attachment ring B is inwardly deformed to provide an inwardly extending top flange 36 that secures switch blade member D and metal plate 30 within insulator recess 24. The flange 36 is deformed such that the peripheral underside of terminal plate 30 preferably is in compressive engagement with base portion 26 of switch blade member D for minimizing resistance and providing optimum conductivity.

A flexible switch blade 40 extending into the opening within annular base portion 26 of switch member D is bent downwardly from base portion 26 and has a free end portion normally engaging fixed contact 10 that is electrically connectable with a battery electrode. An electrical lead may be soldered, welded or otherwise attached to the outer surface of metal terminal plate 30 for connection to a device that is to be powered by the battery. Thus, switch blade 40 is in the battery circuit in this example and completes a circuit between fixed contact 10 and metal terminal plate 30. A movable force transfer member such as a bumper 42 of electrical insulating material is interposed between snap-acting flexible foil diaphragm 16 and switch blade 40.

Figure 5:
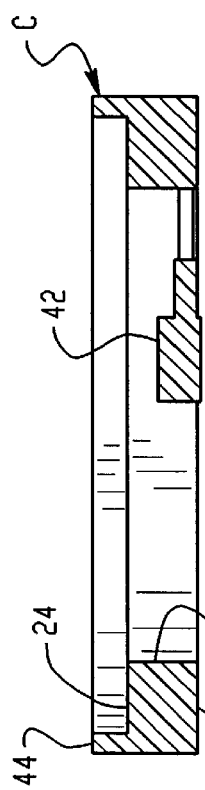
FIG. 5 is a cross-sectional elevational view of an insulator ring used with the switch assembly of FIGS. 1 and 2.
Figure 6:
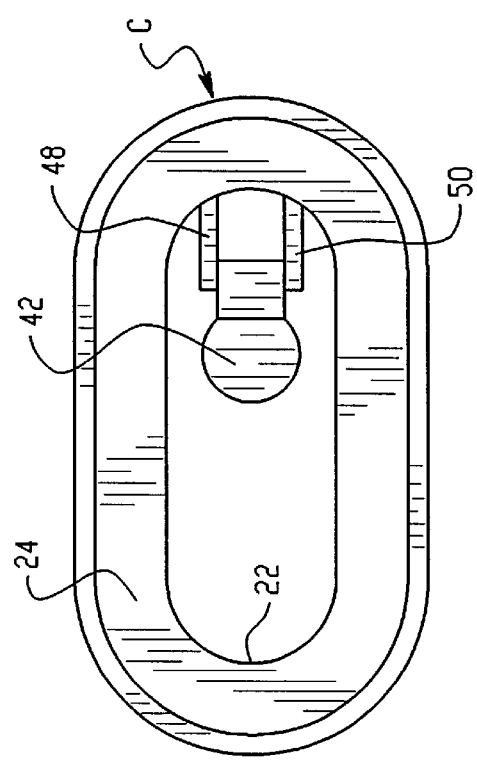
FIG. 6 is a top plan view thereof.

With reference to FIGS. 5 and 6, dielectric support C has top and bottom surfaces 44, 46, and peripheral recess 24 is located adjacent top surface 44. Bumper 42 is molded integrally in one-piece with insulator C and extends into insulator opening 22 from one end thereof Bumper 42 is connected with the main body portion of insulator C by flexible arms 48, 50. In the arrangements shown and described, attachment ring B and insulator C are oval, although it will be recognized that other shapes also are possible. When the shape is oval, rectangular or otherwise elongated, flexible arms 48, 50 preferably are attached to the body portion of insulator C at one of the ends of the elongated configuration.

With reference to FIGS. 9 and 10, switch blade member D preferably is of shape memory alloy such as a nickel-titanium shape memory alloy. However, it will be appreciated that it may be possible to use other shape memory alloys such as copper-based ternaries including copper-zinc-aluminum and copper-nickel-aluminum. The transition temperature range at which the alloy changes from its deformed shape to its recovered shape can be varied by selecting different shape memory alloy compositions and by varying the heat treatment process.

Figure 11:
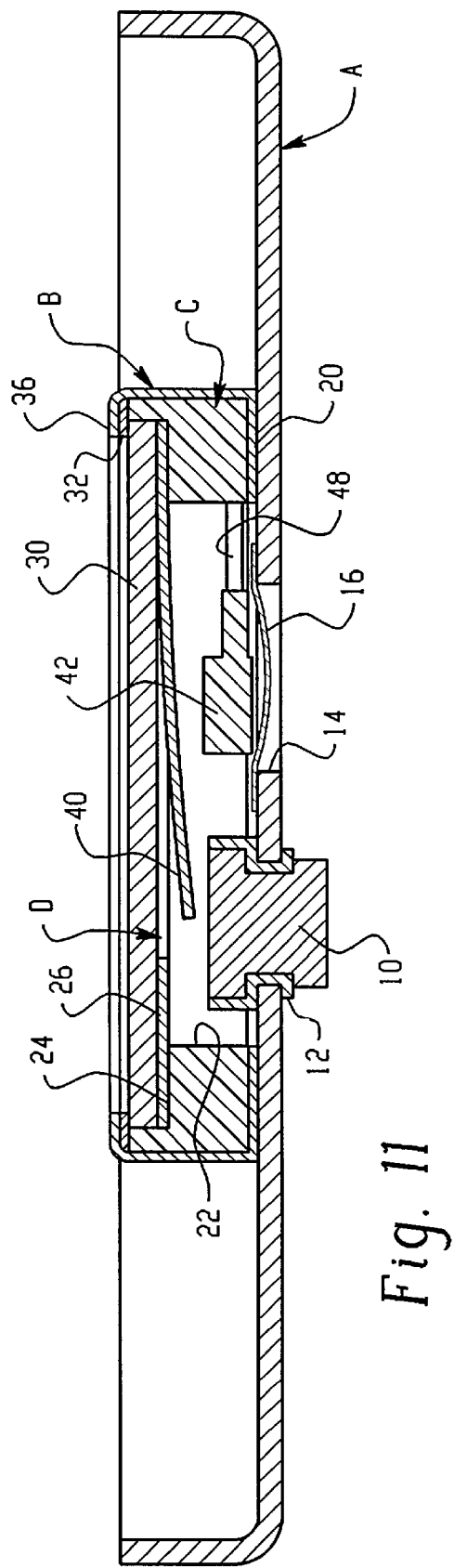
FIG. 11 is a view similar to FIG. 1 showing the switch blade in an open position as a result of an elevated temperature.

In manufacturing switch blade member D of shape memory alloy, the entire switch blade member is heated to the austenitic transformation temperature of the shape memory metal. After cooling to its martensitic state, switch blade 40 is bent relative to base portion 26 to the desired configuration generally shown in FIG. 10. When switch blade 40 again is heated to its austenitic transformation temperature, it reverts back to the general configuration that it had before it was bent. The bent configuration of FIGS. 1 and 10 is commonly known as the deformed shape that the shape memory metal has at normal temperatures. The configuration that the switch blade assumes at its austenitic transformation temperature is shown in FIG. 11 and is known as its recovered shape.

The configuration of the switch components normally would be as shown in FIG. 1 to provide for discharge and recharge of a battery. In response to an elevated temperature condition and/or in response to $I^2R$ heating of switch blade 40, the switch blade moves from its closed position to the open position shown in FIG. 11 by assuming its recovered shape at the predetermined austenitic transformation temperature of the alloy. Switch blade 40 can be treated and processed to remain permanently in the open position or to return to the closed position upon cooling. In batteries, the preferred arrangement is to have the device remain open and function as a one-shot fuse so that the battery circuit will not reclose once a problem condition has been sensed.

Figure 12:
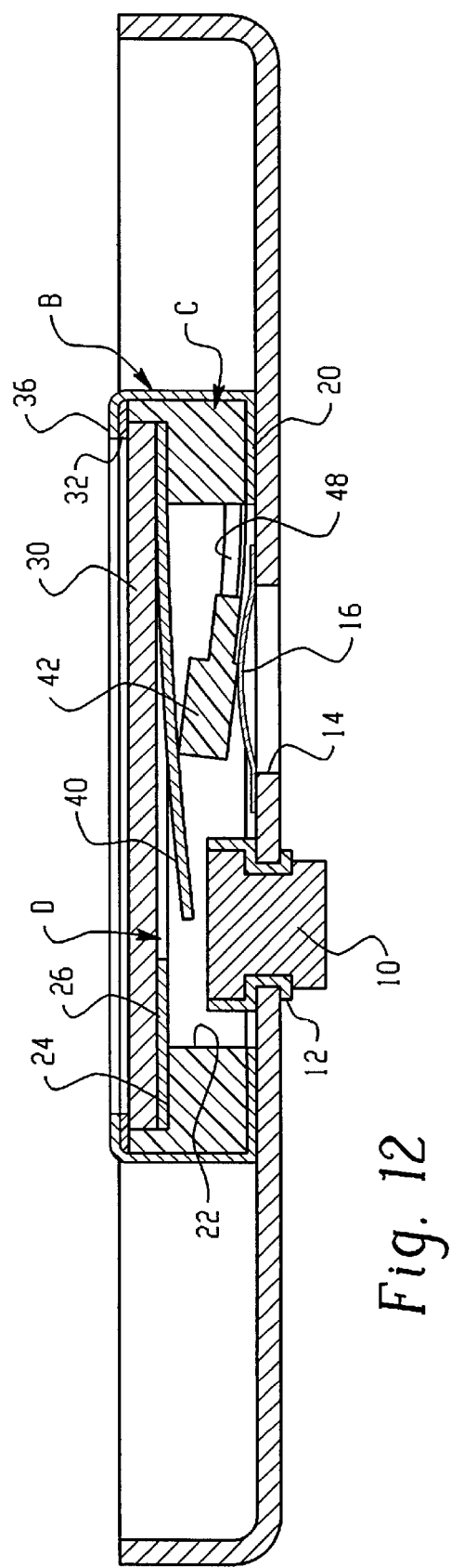
FIG. 12 is a view similar to FIG. 1 showing the switch blade in an open position as a result of an elevated pressure.

In response to an elevated pressure acting on diaphragm 16 on the opposite side thereof from bumper 42, diaphragm 16 snaps to its opposite domed or bubble configuration as shown in FIG. 12 to move bumper 42 and lift switch blade 40 from engagement with fixed contact 10. In the event of excessive pressure, foil diaphragm 16 may rupture for allowing relief of pressure through hole 14. One or more vent openings may be provided through terminal plate 30 or support C and attachment ring B to vent the cavity or chamber within which switch blade 40 is situated.

The pressure responsive snap-acting diaphragm preferably is bistable and remains in the position of FIG. 12 even though the elevated pressure dissipates. The biasing force of switch blade 40 is insufficient to collapse the bubble so that the bubble holds the blade in its open position. This also is the preferred arrangement for other embodiments in which the diaphragm bubble holds the switch member in either its open or its closed position. However, it is possible to make the switch blade with sufficient biasing force to collapse the bubble or to provide a supplemental spring to collapse the bubble and reclose the switch when the pressure dissipates if so desired.

FIG. 13 shows another arrangement wherein a battery terminal 50 extends through a suitable hole in housing member A1 and is electrically isolated therefrom by electrical insulation 52. A pressure port defined by circular hole 54 in housing member A1 is normally closed by a snap-acting flexible foil diaphragm 56 that supports a bumper 58 having a central vent hole 60 therethrough and a central stem 62. An electrically conductive metal foil 64 that defines a fixed contact is positioned on housing member A and is normally engaged by the undersurface of the central portion of a snap-acting bimetal bowed disc or bowed strip switch member E. The central portion of switch member E has a guide hole loosely receiving bumper stem 62. The periphery or peripheral end edges 66, 68 of bimetal bowed disc or bowed strip switch member E engage the undersurface of a metal terminal plate 70 supported on an insulator support ring 76 attached to housing member A as by rivets 78, 80. An electrical insulating member or dielectric foil 82 is positioned on conductive foil 64 outwardly of bumper 58 and the central portion of switch member E.

FIG. 13 shows the closed position of the switch with a circuit being completed from conductive foil 64 to the central portion of switch member E and then through switch member E to its periphery and to metal terminal plate 70. In response to an elevated pressure, switch member E assumes the configuration shown in FIG. 14 with the periphery or peripheral end edges 66, 68 of the bimetal bowed disc or bowed strip engaging insulator foil 82 to provide an open circuit. Conductive foil 64 may have a plurality of radial score lines extending in a direction away from bumper 58 so that the foil will rupture along the score lines to facilitate movement of bumper 58 therethrough to the position of FIG. 14.

Figure 15:
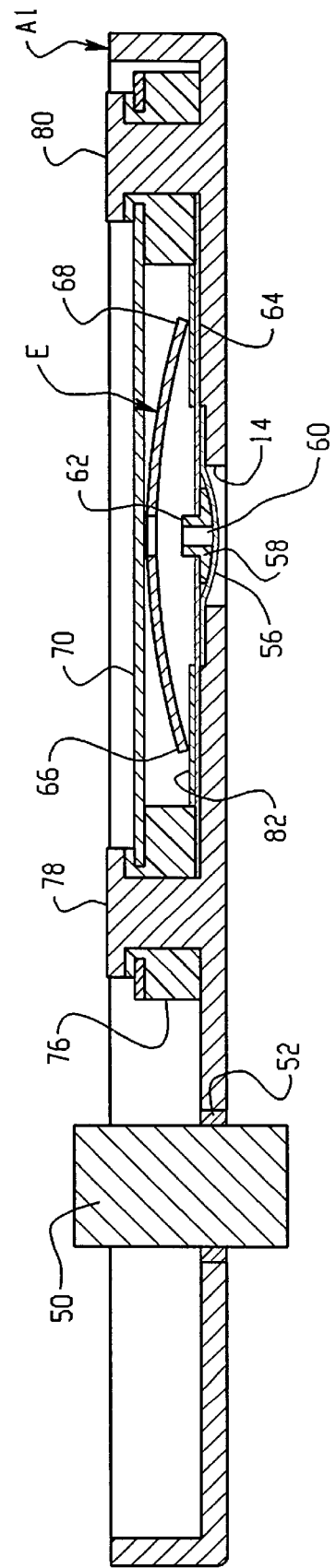
FIG. 15 is a view similar to FIG. 13 and showing the switch member in an open position responsive to an elevated temperature.

FIG. 15 shows the open position of the switch in response to an elevated temperature. Snap-acting bimetal switch member E separates from bumper 58 and assumes the inverted bowed configuration with its central portion engaging or located adjacent to metal terminal plate 70, and with peripheral edges 66, 68 engaging insulator foil 82. Any condition that generates an elevated pressure also will cause an elevated temperature. An elevated temperature softens the bimetal so that it will snap to a reversed configuration with the boost provided by the bumper even though the elevated temperature itself may not be quite adequate to cause reverse snapping.

FIG. 16 shows an arrangement similar to FIG. 13 except that the switch is normally open rather than normally closed as in FIG. 13. In FIG. 16, insulator foil 82a is interposed between the central portion of switch member E and conductive foil 64 so that there is no circuit from conductive foil 64 through switch member E to metal terminal plate 70. In response to an elevated pressure condition, snap-acting bimetal switch member E assumes the configuration shown in FIG. 17 with the disc periphery or strip peripheral end edges 66, 68 of a bowed snap-acting bimetal switch member E engaging conductive foil 64 outwardly of insulator 82a. The upper central portion of switch member E engages the underside of metal terminal plate 70 to complete a circuit through switch member E from conductive foil 64 to metal plate 70. Conductive foil 64 may have a plurality of radial score lines adjacent bumper 58 so that the foil will rupture when the diaphragm moves to the position of FIG. 17.

Figure 18:
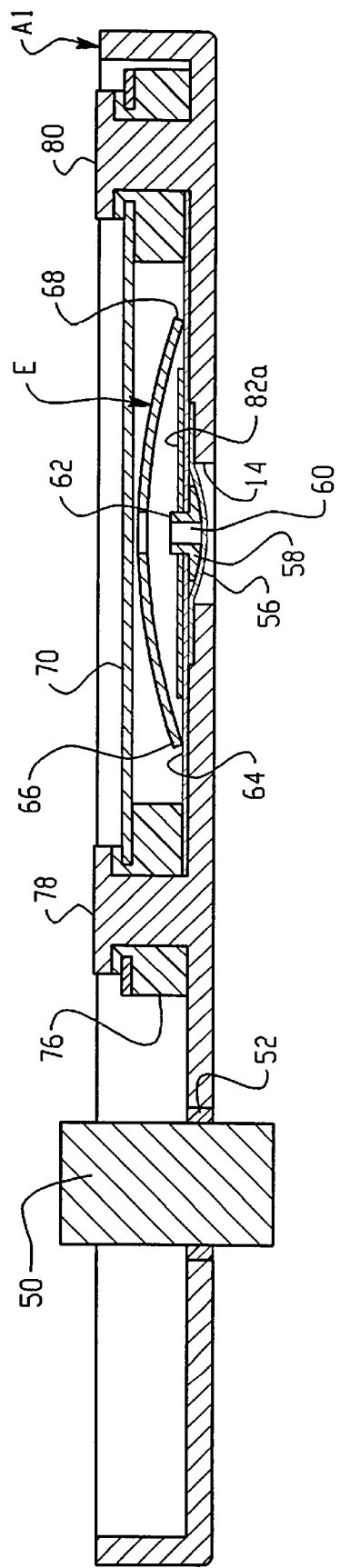
FIG. 18 is a view similar to FIG. 16 and showing the switch member in a closed position responsive to an elevated temperature.

FIG. 18 shows the arrangement of FIG. 16 in a closed position in response to an elevated temperature. When bimetal E is heated to a predetermined temperature, it snaps to the inverted position shown in FIG. 18 with its central portion engaging the underside of metal terminal plate 70 and with its peripheral edge or end edges 66, 68 engaging conductive foil 64. When bimetal E snaps inverted in response to temperature, it separates from bumper 58 as shown in FIG. 18.

Figure 19:
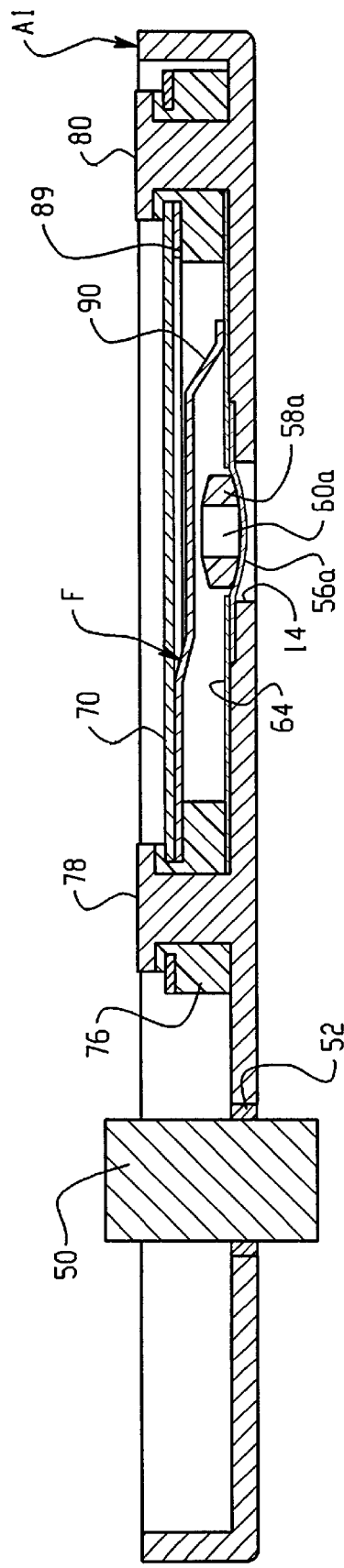
FIG. 19 is a cross-sectional elevational view of another embodiment shown in a normally closed position.

FIG. 19 shows another arrangement similar to FIG. 13 but with a different kind of switch member. In the arrangement of FIG. 19, the periphery 89 of an annular base portion on switch member F is supported on insulator support ring 76 beneath metal plate 70. A switch blade member 90 of shape memory metal normally projects inwardly from annular or ring base portion 89 and engages electrically conductive foil 64 to complete a circuit between foil 64 and metal plate 70. Switch blade 90 is movable to an open position as shown in FIG. 20 upon assuming its recovered shape at an elevated temperature. In the alternative, switch blade member 90 assumes its open position in response to an elevated pressure as shown in FIG. 21. Flexible foil diaphragm 56a snaps in a direction toward switch blade 90 carrying bumper 58a therewith to place switch blade 90 in its open position. Hole 60a in bumper 58a allows venting of pressure therethrough upon rupture of diaphragm 56a in response to excessive pressure.

Figure 22:
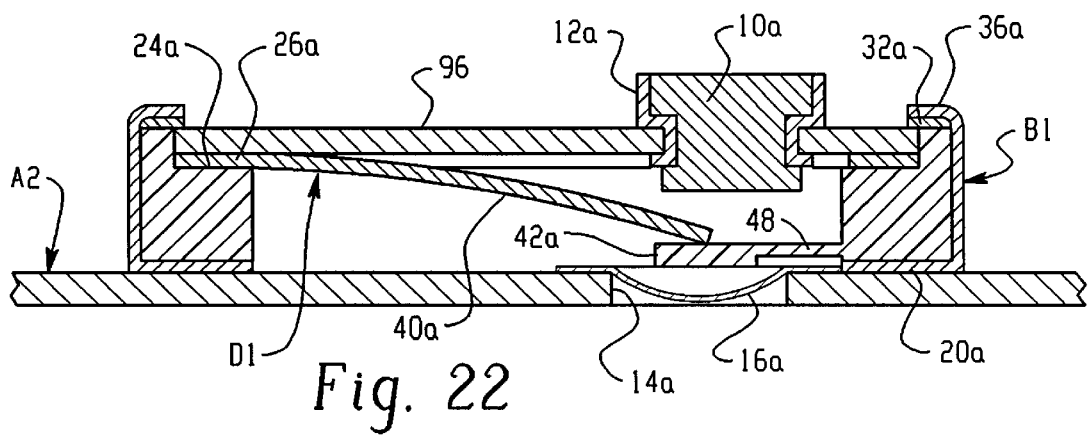
FIG. 22 is a cross-sectional elevational view of another embodiment of a switch assembly having a normally open position.
Figure 23:
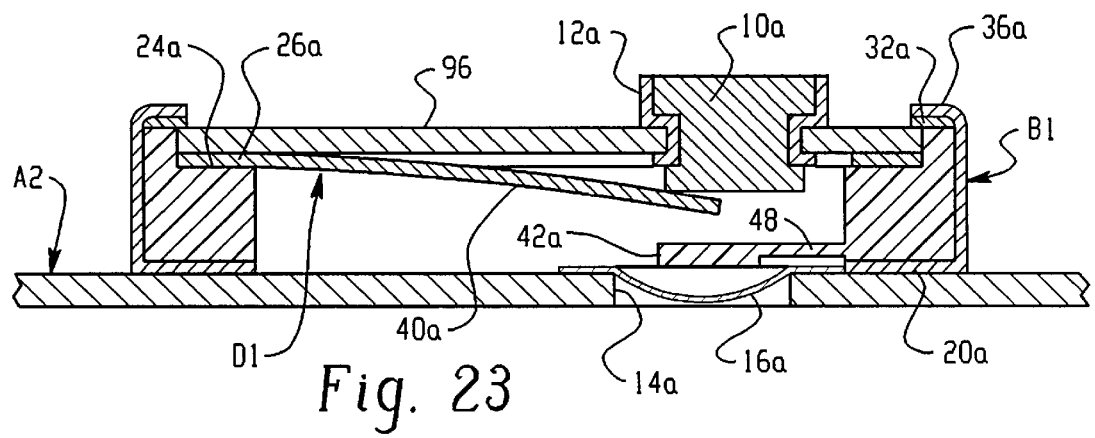
FIG. 23 is a cross-sectional side elevational view similar to FIG. 22 and showing the switch blade in a closed position as a result of an elevated temperature.
Figure 24:
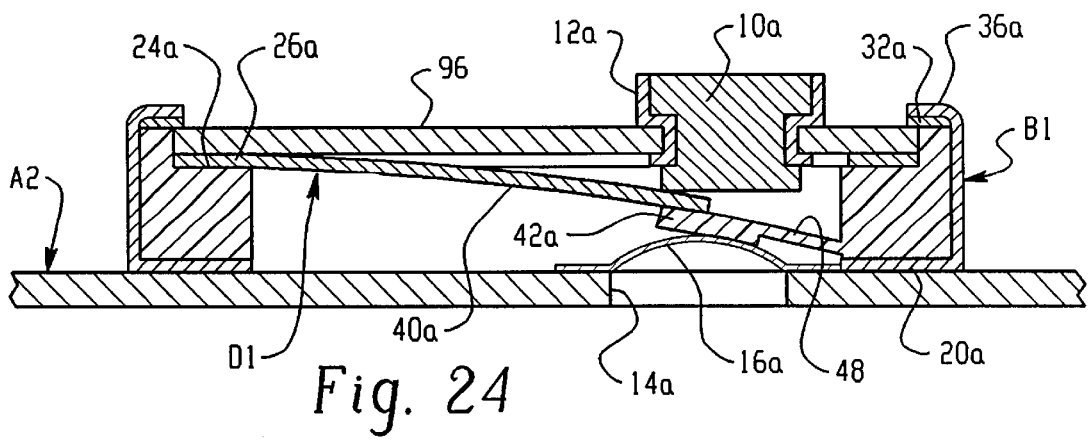
FIG. 24 is a cross-sectional side elevational view similar to FIG. 22 and showing the switch blade in a closed position as a result of an elevated temperature.

FIG. 22 shows an arrangement similar to FIG. 1 except that the switch is normally open instead of normally closed as in FIG. 1. In this arrangement, metal terminal plate 96 has fixed contact 10a attached thereto and isolated therefrom by electrical insulation 12a. Switch blade 40a of shape memory metal in FIG. 22 moves from an open position to a closed position as shown in FIG. 23 by changing to its recovered shape in response to an elevated temperature in the chamber within which it is situated and/or in response to self-induced $I^2R$ heating. In the alternative, switch blade 40a may be moved from its open position to its closed position by an elevated pressure acting through pressure port 14a on the opposite side of snap-acting diaphragm 16a from bumper 42a as shown in FIG. 24.

Figure 25:
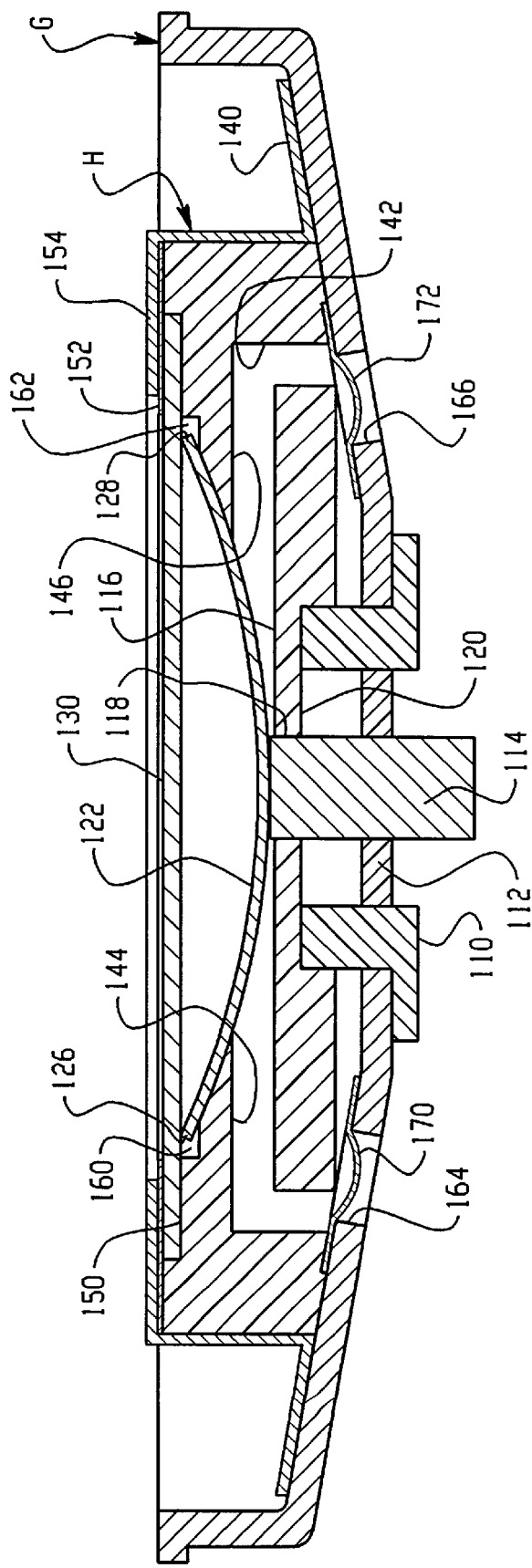
FIG. 25 is a cross-sectional side elevational view of another normally closed embodiment.

FIG. 25 shows another arrangement wherein a metal housing member G such as a lid or end cap for a battery case or the like has a cylindrical guide sleeve 110 secured thereto. A disc 112 of electrical insulating material is attached to the interior of guide sleeve 110 and to a battery terminal 114 that is connected to a battery electrode. A movable force transfer member 116 of electrical insulating material has a central hole 118 therethrough freely receiving battery terminal 114. A circular recess 120 in the underside of movable force transfer member 116 slidably receives guide sleeve 110. Force transfer member 116 may be termed an actuator, and may be a disc or a generally rectangular bar with opposite end portions. A bowed strip or bowed disc switch member 122 of bimetal or shape memory material has a central portion normally engaging terminal 114, and outer peripheral edge or edges 126, 128 normally engaging a metal terminal plate 130.

An attachment ring H has an outwardly extending flange 140 welded or otherwise secured to housing member G. An electrical insulating support ring member 142 is received within attachment ring H on housing member G. Inwardly extending supports 144, 146 support the peripheral or end portions of switch member 122, and the bottom of a recess 150 supports metal terminal plate 130. An electrical insulating washer 152 is positioned on the top surface of insulating ring 142 and metal terminal plate 130, and the upper peripheral portion of attachment ring H is deformed inwardly into a securing flange 154. Recesses 160 and 162 are located outwardly of switch member ends 126, 128 between supports 144, 146 and metal terminal plate 130.

Pressure ports provided by holes 164, 166 in housing member G normally are closed by snap-acting diaphragms 170, 172. In response to an elevated temperature, shape memory switch member 122 moves from its deformed shape at normal temperatures as shown in FIG. 25 to its recovered shape at an elevated temperature as shown in FIG. 26 to open the switch. In response to an elevated pressure, diaphragms 170, 172 snap to the positions shown in FIG. 27 and cause movable force transfer member or actuator 116 to move upwardly for separating the central portion of switch member 122 from the upper end of fixed contact 114. When actuator 116 is a disc, diaphragms 170, 172 are located at diametrically opposite positions adjacent the outer periphery of the disc. When actuator 116 is rectangular, diaphragms 170, 172 are located adjacent the opposite ends thereof. In the event of excessive pressure, diaphragms 170, 172 may rupture to vent the interior of the battery case. In the arrangement of FIGS. 25–27, switch member 122 preferably is of shape memory metal but it also may be a bimetal.

Figure 28:
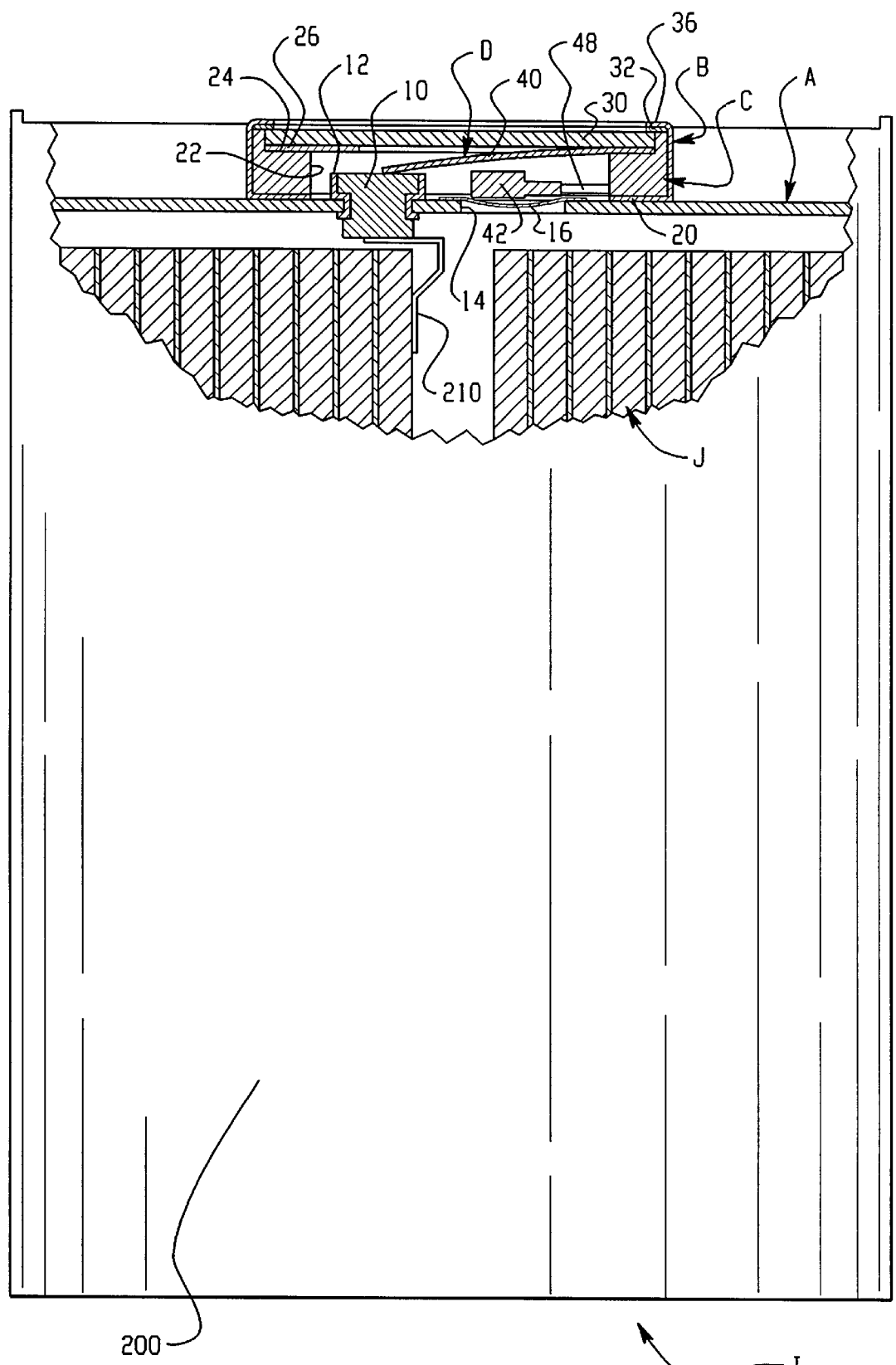
FIG. 28 is a cross-sectional elevational view showing the switch assembly of FIG. 1 attached to the case of a battery or electrochemical cell.

FIG. 28 shows the switch assembly of FIG. 1 attached to a battery or electrochemical cell I having a metal case 200 with lid or end cap A welded thereto. It will be recognized that the other embodiments may be attached to the case of a battery or electrochemical cell in a similar manner. Case 200 may have many different configurations including, but not necessarily limited to, cylindrical and rectangular.

Case 200 may contain a wrapped multi-layer assembly J that forms the battery electrodes, and a wire 210 is attached between the electrode and fixed contact 10. One electrode of electrode assembly J is attached to fixed contact 10 as by wire 210 while the other electrode is connected to battery case 200. In the arrangement shown in FIG. 26, fixed contact 10 is the positive battery terminal while the battery case and the lid are the negative terminal. However, it will be recognized that reverse arrangements also are possible and either the positive or negative battery electrode may be connected with the battery case while the opposite electrode is connected with the fixed contact. In the arrangements of FIGS. 13–21 either a positive or negative battery electrode may be connected with the battery case, of which housing member A1 is a part, and the opposite electrode is connected with fixed contact 50. In the arrangement of FIGS. 25–27, either the positive or negative battery electrode is connected with the battery case, of which housing member G is a part, and the opposite electrode is connected with fixed contact 114.

Electrode assembly J may be of many types including stacked, plate and spirally wound, and is generally shown as a spirally wound or jelly roll type. In such a construction, strips of anode and cathode material with a separator strip between them are wound into a shape for reception in the open top portion of the battery case that has integral peripheral and bottom walls. The anode material is a consumable metal and the cathode material is reducible by electrochemical action. The separator may be a porous electrical insulator material that is ionically conductive. The electrode assembly is inserted into the container forming the battery case, and an electrolyte of solvent containing a conductive solute is added to the container. The cover or end cap then is attached sealingly to the open top of the container to seal the electrode assembly and electrolyte within the battery case.

Figure 29:
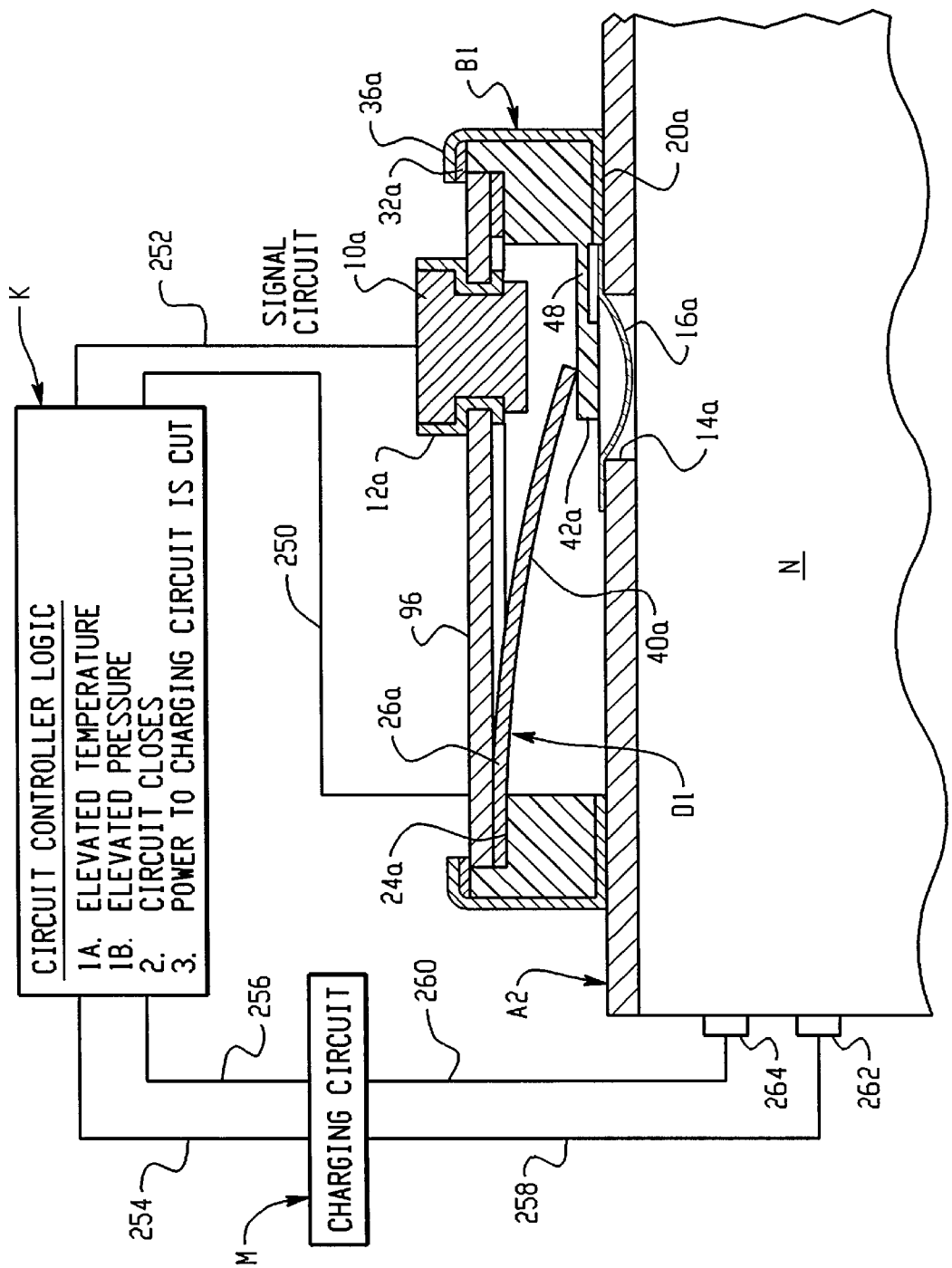
FIG. 29 is a cross-sectional elevational view of the switch assembly of FIGS. 22–24 in combination with a charging circuit to illustrate an example of one application for a normally open switch in accordance with the present application.

With reference to FIG. 29, electrical leads 250, 252 for a signal circuit are soldered, welded or otherwise attached to metal plate 96 and fixed contact 10a of the normally open switch assembly described with reference to FIGS. 22–24, and are connected with a controller K. Leads 254, 256 connect controller K with a charging circuit M that in turn is connected by leads 258, 260 with terminals 262, 264 of an electrochemical cell N.

By way of example, the arrangement of FIG. 29 may be used in a system that has a plurality of individual cells that are constantly charging, such as in an electrochemical cell package that includes a plurality of individual cells for an electric vehicle. Each individual cell would have a sensing switch in accordance with the present application associated with the cell housing to sense an excessive pressure or temperature condition. When such a condition is sensed, the switch closes to send a signal to controller K for cutting off charging current to that particular cell while leaving the remaining cells in service. Other normally open embodiments may be used in the same manner.

When items are referred to as being plated, it will be recognized that this includes, but is not necessarily limited to, coating by electroplating, sputtering or vapor deposition. Materials and platings will be identified by way of example with reference to FIG. 1. Lid A and attachment ring B are nickel plated cold rolled steel. Fixed contact 10 is aluminum. Shape memory actuator D is nickel-titanium provided with a gold strike covered by silver plating on all surfaces, including peripheral surfaces. This provides current flow from precious metal on one surface to the other surface through the peripheral precious metal. Terminal or contact plate 30 is silver plated brass, including opposite surfaces and the peripheral surface. Diaphragm 16 is of aluminum. Similar parts in other embodiments are of similar materials and platings. In the embodiments of FIGS. 13–19, foil contact 64 is of a precious metal such as silver or gold or a metal foil plated with a precious metal. However, it will be recognized that the improvements of the present application are not necessarily limited to these particular materials and platings.

The resistance of the switch assembly is less than 20 milliohms, more preferably less than 12 milliohms, and most preferably not greater than 6 milliohms. In the embodiment of FIG. 1, this resistance is measured across the outer surfaces of metal terminal plate 30 and fixed contact 10. When closed, the movable switch member or blade has sufficient stiffness and bending strength to engage the fixed contact with a force of at least 150 grams. The extremely low resistance is achieved by plating the parts as indicated, by placing the terminal plate in compression against the periphery of the switch member and by providing high force of engagement between the switch member and the fixed contact. The other embodiments have a corresponding low resistance.

Figure 30:
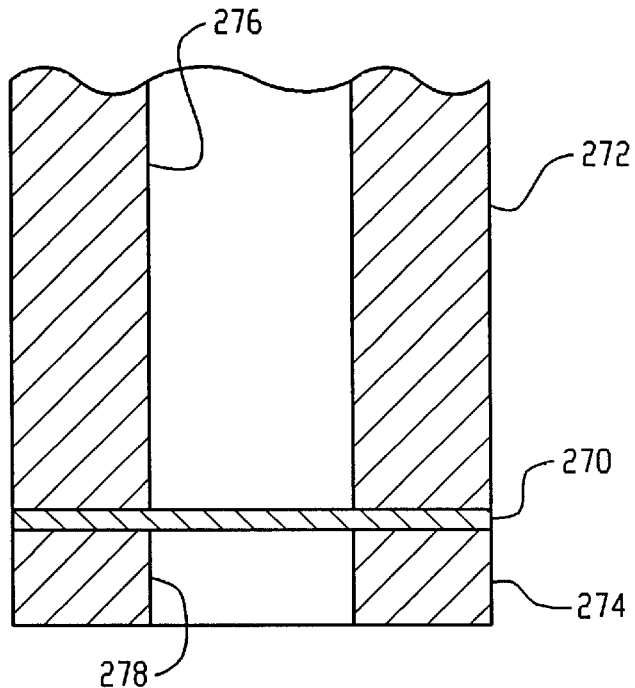
FIG. 30 is a partial cross-sectional elevational view showing how a snap-acting diaphragm is positioned for forming by fluid pressure.
Figure 31:
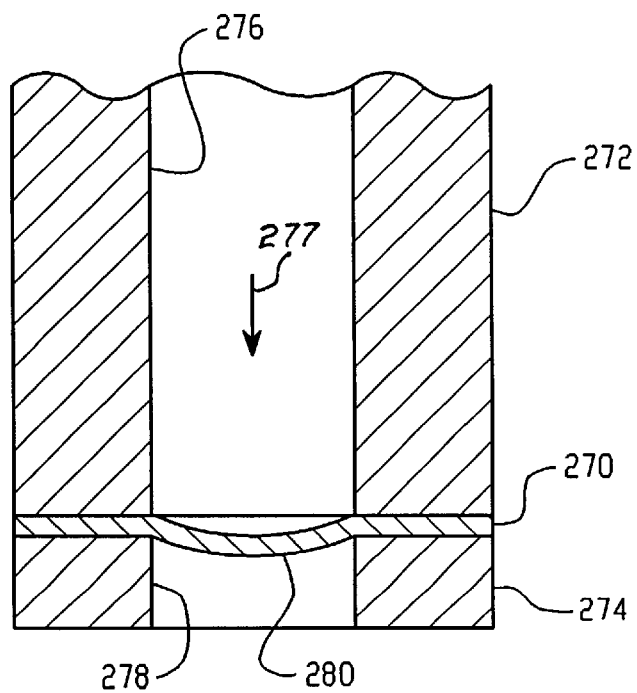
FIG. 31 is a view similar to FIG. 30 and showing pressure applied to a foil disc for forming a smoothly curved snap-acting dimple or bubble therein.

FIGS. 30 and 31 show an aluminum foil diaphragm 270 peripherally clamped in sealed relationship between cylindrical dies 272, 274 having central cylindrical passages 276, 278 therethrough. Passage 276 in die 272 is connected through a suitable control with a source of high fluid pressure that preferably is air but could be a liquid. When fluid pressure is admitted to passage 276 as indicated by arrow 277, the pressure acts uniformly on foil 270 to deform same into cylindrical passage 278 in die 274 and provide a smoothly curved bubble or dome 280 therein. Thus, the bubble is formed by a substantially uniform pressure acting on the entire area of the bubble.

By way of example, the fluid pressure used to produce bubble 280 in an 1100 or 3003 series aluminum foil having a thickness between $2/1000$–$5/1000$ inch may be around 300 p.s.i.g. The pressure required to reverse the direction of the bubble usually is slightly greater, such as around 320 p.s.i.g. The bubble collapses and reverses with snap action when the pressure acting on it is at least equal to, and usually slightly greater than, the pressure that formed it. Many different materials may be used for the foil diaphragm, including nickel plated steel, as long as the material is compatible with the electrolyte used in the cell.

It will be recognized that the fluid pressure used to form the bubble may vary depending on the thickness and properties of the foil, and the application in which the diaphragm will be used. For use with electrochemical cells, the diaphragm preferably snaps in a reverse direction at a pressure of at least 250 p.s.i.g., and more preferably within 10% of at least 300 p.s.i.g. However, it will be recognized that snap action at other pressures can be used. Forming the snap-acting bubble with fluid pressure rather than mechanically such as by stamping provides more uniform stresses in the foil material rather than concentrated stresses that are produced by stamping. This enables formation of a snap-acting bubble that will snap in a reverse direction when subjected to a reverse fluid pressure that is within about 10% of the fluid pressure that formed it. The bubble undergoes very rapid buckling and reversal when the critical predetermined pressure is reached and, while it is not a true snap-acting movement, it is so rapid that for all intents and purposes it may be considered to be snap-acting. In all embodiments, one or more vent openings may be provided for the chamber in which the switch member is positioned in the event the diaphragm ruptures due to excessive pressure.

Shape memory alloys or bimetal materials may be selected to have a wide range of transformation or transition temperatures. The shape memory alloy or bimetal material selected is one that has a transformation or transition temperature approximating that of the over temperature condition to be protected against. For use in batteries, examples of transformation temperatures for shape memory materials, plus or minus 5°, include 62° C., 73° C. and 82° C. These examples would have transformation temperature ranges of approximately 57–67° C., 58–78° C. and 77–87° C. It will be recognized that a wide range of shape memory alloys or bimetal materials may be chosen depending upon the application for the thermal switch assembly. The switch can be fabricated to change from a normally closed or normally open position to the opposite position at an elevated temperature in the range of about 60–125° C. A preferred range is about 65–75° C.

The switch of the present application preferably functions as a one-shot fuse by remaining in the position it assumes in response to an elevated temperature or pressure even after the elevated temperature or pressure dissipates. For example, a normally closed switch that moves to an open position in response to an elevated temperature or pressure will remain open rather than reclosing upon dissipation of the elevated temperature or pressure that initially caused the movement. In the case of a bimetal switch member, this may be done by using a fuse disc or fuse strip bimetal material that snaps to a different position upon being heated to a predetermined temperature and does not revert to its original position when cooled. In the case of a shape memory switch member, this may be done by using a shape memory material that moves to a different position upon being heated to a predetermined temperature and changing from its deformed state to its recovered state, and does not revert to its deformed state or its original position upon cooling.

The snap-acting pressure responsive diaphragm preferably is bistable. Upon snapping to its opposite position under the influence of a predetermined pressure, the diaphragm remains in that opposite position even though the pressure dissipates. The force of the switch member acting on the diaphragm is insufficient to collapse the diaphragm so that it holds the switch member in the position that it is moved to in response to an elevated pressure even after the pressure dissipates.

Although a switch that functions as a one-shot fuse is a preferred arrangement as described above, it will be recognized that the improvements of the present application can be used in arrangements where the switch member reverts to its original position when the elevated temperature or pressure dissipates. The bimetal material may be one that snaps to a new position upon being heated to a predetermined elevated temperature and snaps back to its original position upon cooling. The shape memory material may be one that moves to a new position upon being heated to a predetermined temperature by changing from its deformed shape to its recovered shape, and reverts to both its original position and its deformed state upon cooling. The diaphragm may be one that is not bistable, or a supplemental biasing force may be provided to collapse the diaphragm bubble and allow movement of the switch member back to its original position upon dissipation of the elevated pressure. It also is possible to provide a manual reset button to reset the switch member back to its original position.

For purposes of description, the position of the diaphragm bubble when it extends toward the source of high pressure such as in FIG. 1 may be considered a passive position, and its opposite position holding the switch member in its alternative position such as in FIG. 12 may be considered an operational position. The same is true for all embodiments. The terminal plate and the fixed contact formed by the aluminum rivet or foil may be called conductors or metal members that are connected in a closed position of the switch member and are disconnected in the open position of the switch member. The foil fixed contact may be welded or otherwise attached to the housing member to provide low resistance.

Although the invention has been shown and described with reference to certain preferred embodiments, it is obvious that equivalent alterations and modifications will occur to others skilled in the art upon the reading and understanding of this specification. The present invention includes all such equivalent alterations and modifications, and is limited only by the scope of the claims.

We claim:

1. A temperature and pressure responsive switch assembly comprising:
   a temperature responsive switch member having open and closed positions, said switch member being in one of said positions at normal temperature and automatically being moveable to the other of said positions responsive to an elevated temperature;
   a pressure responsive snap-acting diaphragm co-operable with said switch member to move said switch member from said one position to said other position responsive to an elevated pressure;
   an electrically insulating support member supporting said switch member; and
   a force transfer member comprising a bumper interposed between said switch member and said diaphragm, said force transfer member is integral with said support member and connected thereto by at least one flexible arm.

2. The switch assembly of claim 1 wherein said diaphragm includes a bubble having a passive position in which it extends in a direction away from said switch member when said switch member is in said one position and that has an operational position in which it extends in a direction toward said switch member when said diaphragm responds to an elevated pressure to place said switch member in said other position.

3. The switch assembly of clam 2 wherein said bubble is bistable and remains in said operational position to maintain said switch member in said other position following dissipation of the elevated pressure that caused said bubble to move from said passive position to said operational position.

4. The switch assembly of claim 1 wherein said bumper is supported on said diaphragm.

5. The switch assembly of claim 1 wherein said switch member includes a flexible blade and is of shape memory metal.

6. The switch assembly of claim 1 wherein said switch member comprises a bowed member.

7. The switch assembly of claim 6 wherein said bowed member has a central portion and an outer peripheral portion, and said switch member in said closed position thereof provides a circuit between said central portion and said peripheral portion.

8. The switch assembly of claim 7 wherein said bowed member comprises a bimetal disc or strip.

9. The switch assembly of claim 7 wherein said bowed member comprises a disc or strip of shape memory alloy.

10. The switch assembly of claim 1 including a terminal plate metal member and a fixed contact metal member, said switch member being in engagement with both said terminal plate and said fixed contact in said closed position thereof and being out of engagement with at least one of said metal members in said open position thereof.

11. The switch assembly of claim 10 wherein said fixed contact is attached to said terminal plate and isolated therefrom by electrical insulating material.

12. The switch assembly of claim 10 wherein said terminal plate and said fixed contact are on opposite sides of said switch member.

13. The switch assembly of claim 10 wherein said switch member comprises a bowed member having a central portion and an outer peripheral portion, and said switch member in said closed position thereof having said central portion of said bowed member engaging one of said metal members and having said peripheral portion of said bowed member engaging the other of said metal members.

14. The switch assembly of claim 10 wherein said fixed contact comprises an electrically conductive foil.

15. A pressure responsive switch assembly including a switch member having open and closed positions, said switch member being in one of said positions at normal pressures, a pressure responsive snap-acting diaphragm cooperable with said switch member to move said switch member to the other of said positions responsive to an elevated pressure, and a moveable dielectric force transfer member interposed between said switch member and said diaphragm, said diaphragm having a passive position in which it is concave relative to said switch member and an operational position in which it is convex relative to said switch member, and said diaphragm being responsive to an elevated pressure to snap from said passive position to said operational position to move said switch member from said one position to said other position.

16. The switch assembly of claim 15 wherein said diaphragm is bistable and remains in said operational position to hold said switch member in said other position following dissipation of the elevated pressure that moved said diaphragm from said passive position to said operational position.

17. The switch assembly of claim 15 wherein said switch member comprises a bowed member having a central portion and said force transfer member engages said central portion to move said switch member from said one position to said other position.

18. The switch assembly of claim 17 including a terminal plate metal member and a fixed contact metal member, said switch member being interposed between said metal members.

19. The switch assembly of claim 18 wherein said bowed member has an outer peripheral portion, said switch member in said closed position thereof having said central portion thereof engaging one of said metal members and having said peripheral portion thereof engaging the other of said metal members.

20. A pressure and temperature responsive switch comprising a fixed contact, said fixed contact comprising an electrically conductive foil, a temperature responsive switch blade comprising a moveable end portion and a fixed end portion, said switch blade having a closed position engaging said fixed contact and an open position out of engagement with said fixed contact, said switch blade normally being in one of said positions under normal pressure and temperature conditions, a flexible diaphragm having a bumper side facing toward said switch blade and an opposite side, and a bumper positioned between said switch blade and said bumper side of said diaphragm, said switch blade being moveable from said one position to the other of said positions responsive to an elevated temperature, said diaphragm being deformable toward said switch blade responsive to an elevated pressure acting on said opposite side thereof, and said bumper being moveable with said diaphragm to place said switch blade in said open position responsive to an elevated pressure and said diaphragm and said bumper being located intermediate said moveable and fixed end portions of said switch blade.

21. The switch of claim 20 including an insulator on which said temperature responsive switch blade is supported, and said bumper being attached to said insulator by at least one flexible arm.

22. The switch of claim 20 wherein said switch blade is of shape memory metal, said switch blade having a deformed shape at normal temperatures in said open position thereof and having a recovered shape at an elevated temperature in said other position thereof.

23. The switch of claim 20 including a housing member having a hole therethrough closed by said diaphragm, said fixed contact being attached to said housing member adjacent said diaphragm, an insulator attached to said housing member in outwardly-spaced surrounding relationship to said fixed contact said diaphragm and said bumper, and said switch blade being supported on said insulator.

24. The switch of claim 23 including an insulator retainer attached to said housing member in outwardly-spaced surrounding relationship to said fixed contact said diaphragm and said bumper, and said insulator being attached to said insulator retainer.

25. The switch of claim 24 wherein said switch blade is on a switch blade member having a base portion supported on said insulator, and a metal plate engaging said base portion of said switch blade member on the opposite side thereof from said switch blade.

26. The switch of claim 20 wherein said switch blade is on a switch blade member having a base portion from which said switch blade is bent toward said fixed contact, and a conductive metal plate engaging said base portion of said switch blade member on the opposite side thereof from said switch blade.

27. An insulator for a switch assembly comprising a body portion having an inner periphery and top and bottom surfaces, said inner periphery being oval, having opposite opening ends and circumscribing an opening in said insulator, a bumper extending into said opening and being connected with said inner periphery by at least one bendable arm to provide movement of said bumper in a direction between said top and bottom surfaces by bending of said arm, said arm being connected with said body portion at one of said opening ends.

28. A pressure and temperature responsive switch assembly comprising a housing member having a hole therethrough, a foil diaphragm closing said hole and having a bumper side and an opposite side, a bumper carried by said diaphragm on said bumper side thereof, an conductive temperature responsive member having a central portion aligned with said bumper and having an outer periphery, said temperature responsive member having a first bowed position in which it is concave away from said bumper and a second bowed position in which it is concave toward said bumper, an electrically conductive plate carried by said housing member on the opposite side of said temperature responsive member from said bumper, a fixed contact carried by said housing member adjacent said hole therein, said thermally responsive member being in engagement with both said metal plate and said fixed contact in one of said bowed positions thereof and being out of engagement with at least one of said metal plate and said fixed contact in the other of said bowed positions thereof, said foil diaphragm being responsive to pressure on said opposite side thereof to move toward said metal plate and apply force centrally on said temperature responsive member while said periphery of said temperature responsive member is in engagement with said metal plate to cause said temperature responsive member to move from said first bowed position to said second bowed position, and said temperature responsive member being in said first bowed position at normal temperatures and moving to said second bowed position responsive to an elevated temperature.

29. The switch assembly of claim 28 wherein said temperature responsive member in said first bowed position thereof has a central portion engaging said fixed contact and has said periphery thereof engaging said metal plate, and an insulator on said housing member spaced outwardly of said central portion of said temperature responsive member, said temperature responsive member in said second bowed position thereof having said periphery thereof engaging said insulator.

30. The switch assembly of claim 28 wherein said temperature responsive member in said first bowed position thereof has said periphery thereof engaging said metal plate, an insulator between said bumper and said temperature responsive member, said fixed contact being located outwardly of said insulator, said temperature responsive member in said second bowed position thereof having a central portion thereof opposite from said bumper engaging said metal plate and having said periphery thereof engaging said fixed contact.

31. A pressure and temperature responsive switch assembly comprising a housing member having a hole therein, a foil diaphragm closing said hole, said diaphragm having a bumper side and an opposite side, a movable bumper on said bumper side of said foil diaphragm, a fixed contact on the opposite side of said bumper from said foil diaphragm, a temperature responsive switch blade extending between said bumper and said fixed contact, said switch blade having a normally open position out of engagement with said fixed contact and being movable to a closed position in engagement with said fixed contact responsive to an elevated pressure or temperature, said switch blade having a normal temperature configuration wherein it is in said open position and having an elevated temperature configuration wherein it is in said closed position, and said foil diaphragm being responsive to pressure acting on said opposite side thereof to move said bumper toward said switch blade and place said switch blade in said closed position in engagement with said fixed contact.

32. A pressure and temperature responsive switch assembly comprising a housing member having a fixed contact attached thereto, a metal plate supported on said housing member in spaced relationship to said fixed contact, a temperature responsive conductor positioned between said plate and said fixed contact, said conductor having a bowed configuration with a central portion engaging said fixed contact and an outer portion engaging said plate, said temperature responsive conductor being responsive to an elevated temperature to move out of engagement with said fixed contact, and a moveable pressure responsive device that responds to excessive pressure to move said central portion of said conductor out of engagement with said fixed contact, said moveable pressure responsive device including a moveable actuator having an actuator hole therethrough, said fixed contact extending through said hole into engagement with said central portion of said thermally responsive conductor, and said actuator being moveable relative to said fixed contact toward said conductor to disengage said central portion of said conductor from said fixed contact in response to excessive pressure.

33. The switch assembly of claim 32 wherein said actuator has opposite actuator end portions, pressure ports in said housing member adjacent said actuator end portions, foil diaphragms closing said pressure ports, said foil diaphragms being responsive to pressure on the opposite side of said housing member from said actuator to move in a direction toward said actuator to impart movement to said actuator and disengage said central portion of said conductor from said fixed contact.

34. The switch assembly of claim 32 including a guide sleeve surrounding said fixed contact, said actuator being slidably guided on said guide sleeve.

35. A battery including a battery case having a case interior, a pressure port communicating with said case interior, a pressure responsive snap-acting diaphragm closing said port, a moveable switch member having open and closed positions comprising a switch blade having a moveable end portion and a fixed end portion, said diaphragm having a passive position extending in a direction away from said switch member and an operational position extending in a direction toward said switch member and being positioned for applying force to said switch blade intermediate said fixed and moveable end portions, said switch member being in one of said open and closed positions when said diaphragm is in said passive position and being moved to the other of said open and closed positions responsive to movement of said diaphragm to said operational position by an elevated pressure within said case interior and wherein said diaphragm is bistable and remains in said operational position following dissipation of the pressure within said battery case that caused movement of said diaphragm from said passive position to said operational position.

36. The battery of claim 35 wherein said switch member is temperature responsive and moves from said one position to the other of said open and closed positions responsive to an elevated temperature.

37. The battery of claim 36 wherein said switch member is of bimetal material.

38. The battery of claim 36 wherein said switch member is of shape memory alloy.

39. The battery of claim 35 wherein said switch member comprises a bowed member having a central portion and said diaphragm is positioned for applying force to said central portion.

40. The battery of claim 35 including a dielectric bumper interposed between said switch member and said diaphragm.

* * * * *